United States Patent [19]

Kasuya et al.

[11] Patent Number: 5,550,347
[45] Date of Patent: Aug. 27, 1996

[54] METHOD OF REDUCING WELDING DISTORTION IN ONE SIDE WELDING FOR JOINING PLATES

[75] Inventors: Tadashi Kasuya; Koichi Shinada; Yukihiko Horii, all of Futtsu; Tateo Miyazaki, Osaka, all of Japan

[73] Assignees: Nippon Steel Corporation, Tokyo; Hitachi Zosen Corporation, Osaka, both of Japan

[21] Appl. No.: 313,271

[22] PCT Filed: Feb. 3, 1994

[86] PCT No.: PCT/JP94/00162

§ 371 Date: Oct. 28, 1994

§ 102(e) Date: Oct. 28, 1994

[87] PCT Pub. No.: WO94/17951

PCT Pub. Date: Aug. 18, 1994

[30] Foreign Application Priority Data

Feb. 4, 1993 [JP] Japan .................................. 5-017724

[51] Int. Cl.⁶ .................................................. B23K 9/00
[52] U.S. Cl. ............................................... 219/137 R
[58] Field of Search ........................... 219/73, 137 R, 219/161

[56] References Cited

U.S. PATENT DOCUMENTS

| 1,512,787 | 10/1924 | Morton | 219/137 R |
| 2,106,987 | 2/1938 | Powell | 219/73 |
| 2,449,082 | 9/1948 | McCabe | 219/73 |
| 4,046,988 | 9/1977 | Okuda et al. | 219/137 R |
| 5,214,265 | 5/1993 | Pollack | 219/73 |

FOREIGN PATENT DOCUMENTS

| 0300369 | 1/1989 | European Pat. Off. . |
| 53-51153 | 5/1978 | Japan . |
| 4-143075 | 5/1992 | Japan . |

OTHER PUBLICATIONS

Magazine of Welding Society, vol. 39, No. 8, p. 792 (Aug. 1970); (No Translation).
Thesis of Japanese Ship Building Society, vol. 136, p.441 (Nov. 1974); (No Translation).
Thesis of Japanese Ship Building Society, vol. 133, p.267, (May 1973); (No Translation).
Magazine of Japanese Conctraction Association (JSSC), vol. 10, No. 101, p.35 (May 1974); (No Translation).
Thesis of Japanese Ship Building Society, vol. 171, p.395 (May 1992). (No Translation).

*Primary Examiner*—Clifford C. Shaw
*Attorney, Agent, or Firm*—Kenyon & Kenyon

[57] ABSTRACT

The present invention relates to a method of reducing an amount of welding deformation in the case where steel plates to be welded are butted and subjected to tack-welding and then the tack-welded portion is subjected to one side welding for joining the plates.

In the present invention, not less than 3 welding electrodes are used and a welding condition is determined so that the parameter P shown by the expression of $$P = \frac{1}{H} \Sigma \frac{Q_i}{Li + k}$$

can be a predetermined value. In this case, Qi is the heat input of each electrode determined by a current, voltage and speed, and Li is a distance from the first electrode to each electrode, and H is the maximum value of the height of a tack-welded bead, wherein the height H is made to be a value not more than half of the wall thickness of the steel plates to be welded. In the case where tack-welding is conducted using a tab, the parameter P is set to be not more than a predetermined value, and the height Ht of the tack-welded bead of the tab is made to be not more than a half of the wall thickness of the steel plates to be welded, and a welding condition of one side welding for joining the plates is determined so that the parameter Ptab obtained from these values can be not less than a predetermined value.

10 Claims, 6 Drawing Sheets

θ : Groove angle   Rf: Root face

FIG. 6
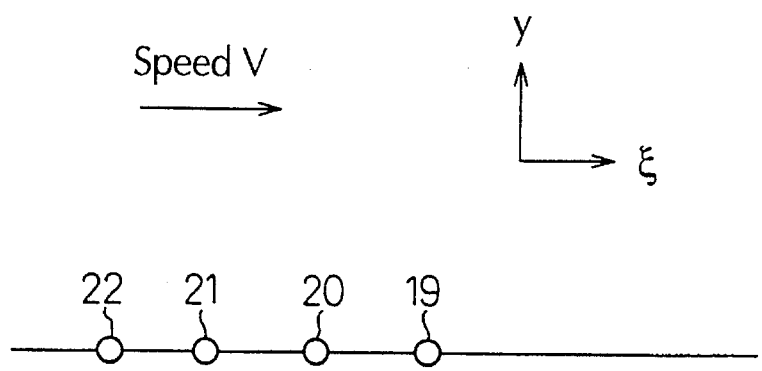
FIG. 7(a)       FIG. 7(b)
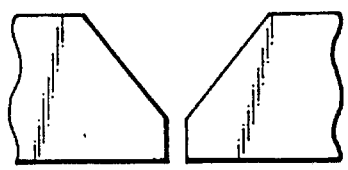 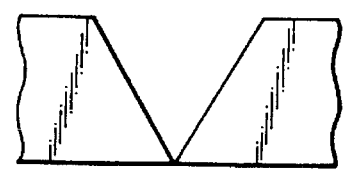
FIG. 7(c)    FIG. 7(d)    FIG. 7(e)
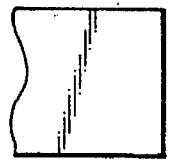 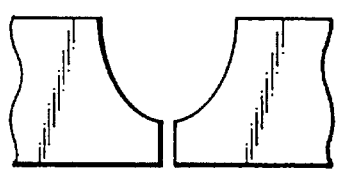 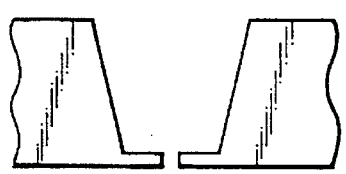

METHOD OF REDUCING WELDING DISTORTION IN ONE SIDE WELDING FOR JOINING PLATES

TECHNICAL FIELD

The present invention relates to a method of reducing welding distortion in one side welding for joining plates. More particularly, the present invention provides a method of reducing welding distortion in one side welding for joining plates, by which welding distortion is reduced when welding is executed under optimal welding conditions in multi-electrode welding.

DESCRIPTION OF THE PRIOR ART

According to the prior art, the following one side welding methods for joining plates are provided. As shown in FIG. 2, steel plates 1, 1' to be welded are butted against each other, and a tack-welded bead, the height of which is the same as the wall thickness of the plates to be welded, is provided in a groove, especially in a groove of the end portion of welding. Alternatively, a tab, the thickness of which is the same as the wall thickness of the plates to be welded, is tack-welded at the end portion of welding so that the height of the bead can be the same as the wall thickness. In this way, the steel plates 1, 1' to be welded are sufficiently bound before the start of welding so as to reduce welding distortion. Alternatively, the following method is provided, in which the plates to be welded are heated by means of gas burners in the process of welding, so that the thermal history is controlled for reducing welding distortion. However, according to the conventional methods in which a high restraining force is applied to the steel plates to be welded using the tack-welded bead or tab, a heavy burden is imposed for preparation before the start of welding, and further it is necessary to repair the plates after the completion of welding, which causes a problem from the viewpoint of enhancing the efficiency of welding. Also, the method of controlling the thermal history using gas burners is disadvantageous in that the welding apparatus becomes large and it is difficult to enhance the welding efficiency.

According to the prior art for reducing welding distortion in one side welding for joining plates, it is a primary object to prevent the occurrence of end cracks which occur at the end of a welded bead in the process of welding. Ando et al. disclosed that these end cracks were caused by welding distortion in the process of welding (Magazine of Welding Society Vol. 30(1970), NO. 8, P792). After that, various investigations were made to investigate the distribution of stress caused in the process of welding (Sato et al.: Theses of Japanese Ship Building Society, Vol. 136 (1974), P441, and Fujita et al.: Theses of Japanese Ship Building Society, Vol. 133 (1973), P267). According to the results of these investigations, in order to prevent the occurrence of end cracks, it is necessary to reduce welding distortion in the process of welding. However, the method for accomplishing the object of reducing welding distortion is limited to the one in which the tack-welded bead or tab is used as described before.

On the other hand, the prior art of the method for preventing end cracks is summarized by Kamichika et al. (Magazine of Japanese Construction Association (JSSC), Vol. 10 (1974), No. 101, P35). According to the prior art summarized by Kamichika et al., the methods in which tack-welded bead and tabs were used were reported in order to prevent the occurrence of distortion, and further a method of restraining the end portion of welding by a hydraulic jack was reported. These conventional techniques aim at reducing welding distortion in the process of welding by strongly restraining steel plates to be welded. According to the method in which steel plates are heated by gas burners, it is impossible to reduce welding distortion to such an extent that the occurrence of end cracks can be prevented.

Japanese Unexamined Patent Publication No. 53-51153 discloses a method in which an amount of welding heat input is reduced at the end portion of plates to be welded and an amount of bead is supplied to make up for the lacking bead in the process of repairing work.

Recently, an investigation has been reported, in which the behavior of residual distortion is analyzed in detail after the completion of welding (Ueda et al.: Theses of Japanese Ship Building Society Vol. 171 (1992), P335). According to the above investigation, local heating conducted by gas burners exerts an influence on the residual distortion which remains in the plates after the completion of welding. When an appropriate heating method is adopted, an amount of distortion is reduced as compared with a case in which the plates are not heated.

As described above, the conventional techniques primarily aim at restraining the steel plates to be welded or controlling the thermal history with gas burners. The conventional techniques do not aim at a welding condition of one side welding for joining plates. Therefore, according to the prior art, it is natural that a heavy burden is imposed on the process of welding, and the welding apparatus becomes large.

SUMMARY OF THE INVENTION

The present invention has been achieved in order to reduce a heavy burden imposed on the preparation work of welding and also to reduce a heavy burden imposed on the welding apparatus. The present invention is accomplished when a welding condition is found, by which the occurrence of welding deformation can be reduced.

The present invention is intended to provide a method of reducing welding distortion in one side welding for joining plates, wherein the method is based on the welding condition described above.

The summary of the invention will be given below.

(1) A method of reducing welding distortion in one side welding for joining plates in which steel plates to be welded are butted against each other, a tack-welded bead is formed and fixed in a groove, and not less than three electrodes are applied, said method of reducing welding distortion in one side welding for joining plates comprising the steps of: estimating a distortion stress generated in the process of welding using an amount of input heat $Qi$ (kJ/mm) computed by the following expression (1) and also using a parameter P computed by the following expression (2); and determining a welding condition of each electrode so that the distortion stress can be in an allowable range.

$$Qi = Ii \times Ei \times 6 + Vi \qquad \text{Expression (1)}$$

where $Ii$ is a current (A) of the i-th electrode with respect to a direction opposite to the welding direction, $Ei$ is a voltage (V) of the i-th electrode, and $Vi$ is a welding speed (cm/min) of the i-th electrode, $$P = \frac{1}{H} \sum_{i=1}^{n} \cdot \frac{Qi}{Li+k} \qquad \text{Expression (2)}$$

where Li is a distance (mm) from the first electrode to the i-th electrode, $L_1$ is 0, n is the number of the electrodes, and k is a positive constant, and where the maximum height of the tack-welded bead in the butted groove is H (mm), wherein H is not more than half of the wall thickness of the steel plate to be welded.

(2) The method of reducing welding distortion in one side welding for joining plates according to item (1), wherein the value of constant k in the expression (2) for computing the parameter P is selected from a range of 10 to 150, and a welding condition of each electrode is determined so that the value P can be not more than 0.14.

(3) A method of reducing welding distortion in one side welding for joining plates in which steel plates to be welded are butted against each other, a tack-welded bead is formed and fixed in a groove, a tab is tack-welded and fixed at an end portion of the steel plates to be welded and not less than three electrodes are applied, said method of reducing welding distortion in one side welding for joining plates comprising the steps of: estimating a distortion stress generated in the process of welding, using Qi, Li, H and constant k described in said expression (1), and also using parameters P and Ptab computed by the following expressions (2) and (3); and determining a welding condition of each electrode so that the distortion stress can be in an allowable range.

$$P = \frac{1}{H} \sum_{i=1}^{n} \cdot \frac{Qi}{Li+k} \qquad \text{Expression (2)}$$

where Li is a distance (mm) from the first electrode to the i-th electrode, $L_1$ is 0, n is the number of the electrodes, k is a positive constant, and H is not more than half of the wall thickness of the steel plate to be welded, $$Ptab = \frac{1}{Ht} \sum_{i=1}^{n} \cdot \frac{Qi}{Li+k} \qquad \text{Expression (3)}$$

where Li is a distance (mm) from the first electrode to the i-th electrode, $L_1$ is 0, n is the number of the electrodes, k is a positive constant, and Ht (mm) is the thickness of the tab, or Ht (mm) is a smaller value between the thickness of the tab and the height of the tack-welded bead formed between the tab and the steel plate to be welded, and Ht is not more than half of the wall thickness of the steel plate to be welded.

(4) The method of reducing welding distortion in one side welding for joining plates according to item (3), wherein the value k in the expression (2) for computing the parameter P and the expression (3) for computing the parameter Ptab is determined to be in a range from 10 to 150, and a welding condition of each electrode is determined so that the value P can be not more than 0.26 and the value Ptab can be not less 0.009.

(5) The method of reducing welding distortion in one side welding for joining plates according to one of items (1) to (4), wherein multi-electrode submerged arc welding is employed under the welding condition that: a current of each electrode is not more than 2400 A; currents of the first and second electrodes are not less than 900 A; currents of the third electrode and after that are not less than 600 A; a welding speed is not less than 60 cm/min and not more than 200 cm/min; and a bonded type flux is used at the surface and the back.

(6) The method of reducing welding distortion in one side welding for joining plates according to one of items (1) to (5), wherein a Y-groove, I-groove, V-groove or U-groove is adopted.

(7) The method of reducing welding distortion in one side welding for joining plates according to one of items (1) to (6), wherein the tensile strength of steel plates to be joined is not less than 390 MPa and not more than 780 MPa, and the wall thickness is not less than 8 mm and not more than 50 mm.

BRIEF DESCRIPTION OF THE DRAWINGS

FIG. 6 is a schematic illustration of the model of thermoelasticity.

FIGS. 7(a) to 7(e) show types of the groove configuration, wherein FIG. (a) is a view showing a Y-groove, FIG. (b) is a view showing a V-groove, FIG. (c) is a view showing an I-groove, FIG. (d) is a view showing a U-groove, and FIG. (e) is a view showing another groove.

DESCRIPTION OF THE PREFERRED EMBODIMENTS

Figure 1:
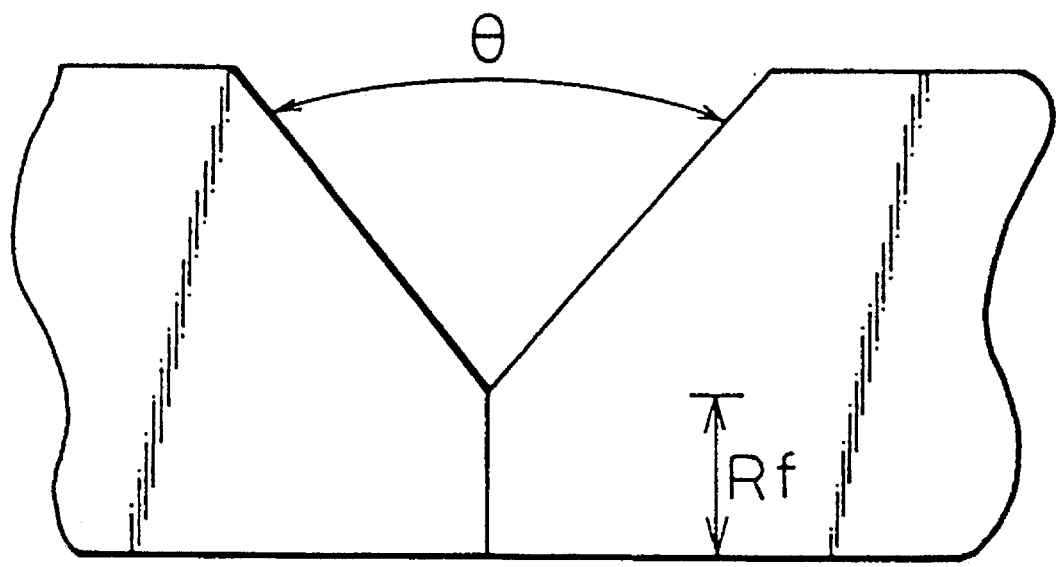
FIG. 1 is a sectional view showing the groove configuration.

It is widely believed that welding distortion caused in the process of one side welding for joining plates can be effectively avoided by means of heating the steel plates with gas burners or strongly restraining them with tabs. According to the present invention, it is not necessary to heat or strongly restrain the steel plates. When the welding condition is determined so that the parameters P and Ptab can be set in a predetermined range, welding distortion is reduced. It is an object of the present invention to enhance the labor efficiency in the process of welding and also to reduce a burden imposed on the welding apparatus.

The present invention is intended to provide a method of reducing welding distortion in one side welding for joining plates in which steel plates to be welded are butted against each other, a tack-welded bead is formed and fixed in a groove, and not less than three electrodes are applied, the method of reducing welding distortion in one side welding for joining plates comprising the steps of: estimating a distortion stress generated in the process of welding using an amount of heat input Qi (kJ/mm) computed by the following expression (1) and also using a parameter p computed by the following expression (2); and determining a welding condition of each electrode so that the distortion stress can be in an allowable range.

$$Qi = Ii \times Ei \times 6 + Vi \qquad \text{Expression (1)}$$

where Ii is a current (A) of the i-th electrode with respect to a direction opposite to the welding direction, Ei is a voltage (V) of the i-th electrode, and Vi is a welding speed (cm/min) of the i-th electrode, $$P = \frac{1}{H} \sum_{i=1}^{n} \cdot \frac{Qi}{Li+k} \qquad \text{Expression (2)}$$

where Li is a distance (mm) from the first electrode to the i-th electrode, $L_1$ is 0, n is the number of the electrodes, and k is a positive constant, and where the maximum height of the tack-welded bead in the butted groove is H (mm), wherein H is not more than half of the wall thickness of the steel plate to be welded.

The above expressions (1) and (2) will be explained as follows.

FIG. 6 is a schematic illustration showing a model of the present invention. Numerals 19, 20, 21 and 22 respectively represent the first, second, third and fourth electrodes. It is assumed that these electrodes are moving on an infinite flat plate from the left to right in FIG. 6. Concerning the coordinate, the first electrode is determined as an origin, and a moving coordinate $(\xi, y)$ is set which moves at the same speed V as the welding speed. Although FIG. 6 shows a condition of 4 electrode welding, the following analysis is made under the condition that the number of electrodes is n. In the case where the number of electrodes is 1, the solution was found by Sato et al. (shown in the reference described before), however, in the case of multi-electrode welding, the solution has not been found yet. In the case where the number of electrodes is n, the solution was found while consideration was given to the linearity in thermoelasticity. Since the cause of end cracks, which is a serious problem caused in one side welding, is a distortion illustrated in FIG. 5(a), stress $\sigma y$ in the y-axis is described as follows.

$$\sigma y = \frac{E\alpha\kappa}{2\pi\lambda V} \left\{ \sum_{i=1}^{n} qi \frac{\xi + Li}{r_i^2} - \frac{V}{2\kappa} \sum_{i=1}^{n} qi \exp\left(-\frac{V(\xi + Li)}{2\kappa}\right) \left[ K0\left(\frac{Vr_i}{2\kappa}\right) + \frac{\xi + Li}{r_i} K1\left(\frac{Vr_i}{2\kappa}\right) \right] \right\} \quad \text{Expression (4)}$$

E: Young's Modulus
α: Coefficient of linear expansion
κ: Coefficient of thermal diffusion
λ: Coefficient of heat transfer
V: Welding speed
$r_i$: $\{(\xi+Li)^2+y^2\}1/2$
Li: Distance between the first electrode and the i-th electrode (L1=0)
qi: Quantity of heat emitted from the first electrode per unit wall thickness in unit time
K0 and K1: 0-order and first order modified Bessel functions of the second kind Consideration is given to the stress $\sigma y$ caused ahead of the welding line that has a strong correlation with the end cracks. As y=0, $r_i = \xi + Li$. As the values K0 and K1 in the expression (4) are relatively small ahead of the welding line, they are neglected. Since E, α, κ and λ are constants, the following expression is derived.

$$\sigma y \frac{1}{V} \sum_{i=1}^{n} \frac{qi}{\xi + Li} \quad \text{Expression (5)}$$

In the actual welding operation, thermal stress is suppressed by the tack-welded bead provided in the groove. However, the height of the tack-welded bead is not necessarily equal to the wall thickness. Therefore, it is necessary to evaluate the stress caused in the tack-welded bead. When the wall thickness is A (mm), a force in the direction of the y-axis acting in the unit length is obtained when the wall thickness is multiplied by the stress, that is, σy·A.

When this force is supported by the tack-welded bead of which the height is H, the following expressions are derived, that is, when the stress in the tack-welded bead is σy', a force acting on the tack-welded bead for each unit length is σy'·H, the following expression is derived.

σy·A=σy'·H

Consequently, the stress σy' in the tack-welded bead can be expressed by the following expression.

σy'=σy·A/H

Since σy is proportional to the expression (5), σy' is proportional to a value obtained when the expression (5) is multiplied by A/H.

At this time, the expression A·qi/V=Qi (heat input used by welding engineers kJ/mm) is satisfied. Therefore, the stress in the tack-welded bead is expressed by the following expression.

$$\sigma y' \propto \frac{1}{H} \sum_{i=1}^{n} \frac{Q_i}{Li + \xi} \quad \text{Expression (6)}$$

The thermal stress can be represented by a point disposed ahead of the melting pool (a point where $\xi=k$). Accordingly, the parameter P can be determined as follows.

$$P = \frac{1}{H} \sum_{i=1}^{n} \frac{Q_i}{Li + k}$$

In the actual welding operation, a base metal to be welded is subjected to not only elastic deformation but also plastic deformation. Furthermore, even in a range of elastic deformation, the temperature dependency exists in the physical values such as Young's modulus. Consequently, the inventors have earnestly investigated the appropriateness of the parameter P on the basis of knowledge acquired here. As a result of the investigation, it has been found that the parameter P can be used as a practical parameter.

Figure 4:
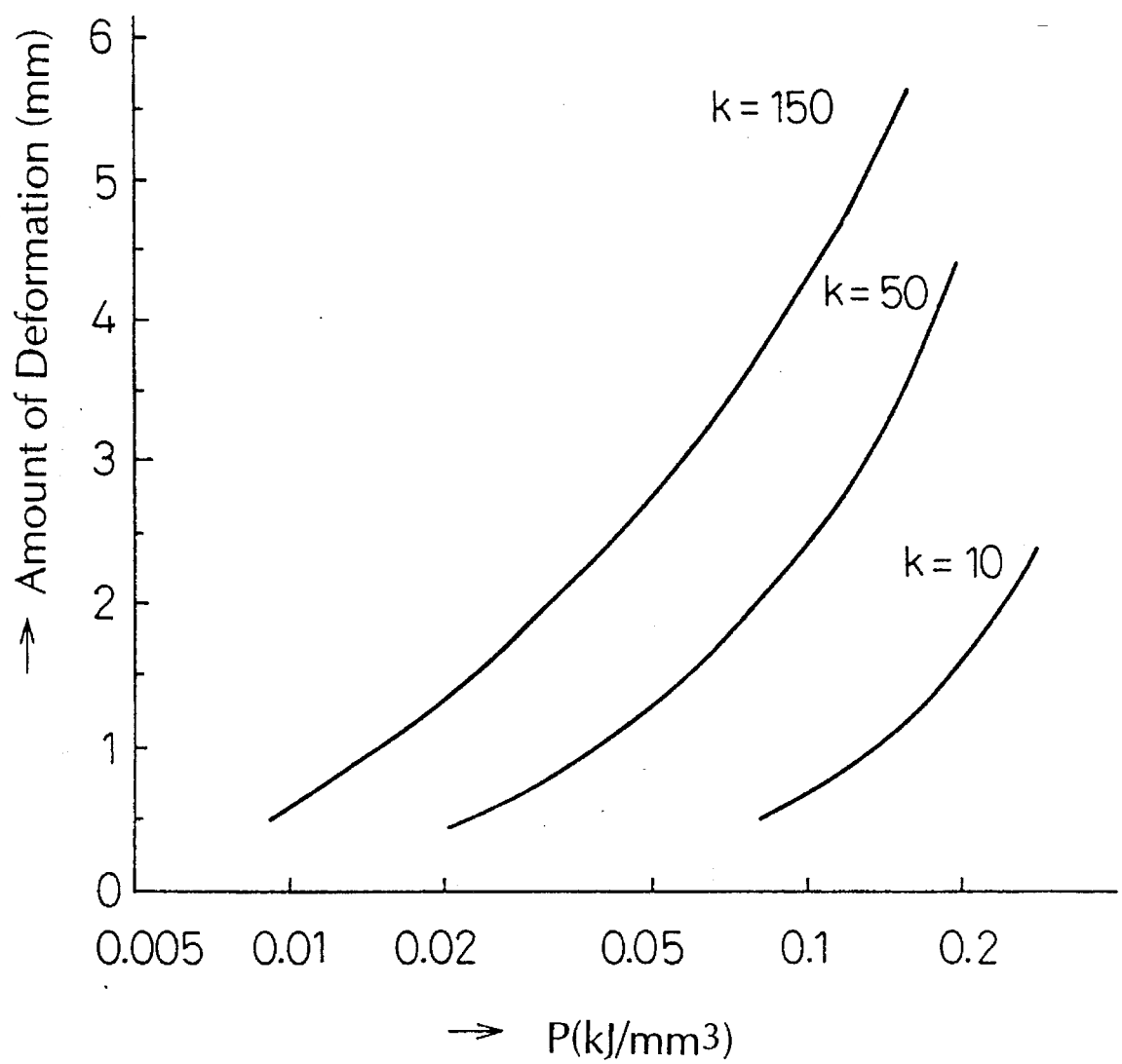
FIG. 4 is a graph showing a relation between the parameter P and an amount of distortion.

FIG. 4 shows that the parameter P corresponds to an amount of deformation. In other words, the horizontal axis in FIG. 4 expresses an amount of deformation caused during the welding operation in an example described later. Therefore, it can be understood that the parameter P is in a good correlation with the amount of deformation caused during the welding operation. Due to the foregoing, when the value P is suppressed in a predetermined range, an amount of deformation can be reduced.

According to the present invention, the parameter Ptab used for the tab has the same relation as that of the tack-welded bead described above. The tab restrains the steel plates to be welded in the same manner as the tack-welded bead. Therefore, it is possible to evaluate the function of the tab in the same manner.

The present invention will be explained in more detail as follows.

First, the parameter p is divided into the two terms of ΣQi/(Li+k) and 1/H, and each term is described as follows.

Term ΣQi/(Li+k) in the parameter P expresses how the welding condition affects an amount of welding deformation. Normally, when the welding heat input is reduced, an amount of welding deformation tends to be reduced. However, in the case of one side welding for joining steel plates, the joining must be completed by one welding operation, so that the heat input cannot be extremely reduced. Configuration of the melting pool in the case of one-electrode welding and that of the melting pool in the case of multi-electrode welding are different. Accordingly, even when the heat input is the same, the welding deformation behavior is different. Therefore, in order to determine the welding condition so that the welding deformation can be reduced, it is necessary to adopt a parameter expressing the configuration of a melting pool or a parameter expressing the arrangement of electrodes.

The inventors were fully convinced of existence of the above parameter, and researched and investigated the same. As a result of the investigation, they have acquired the knowledge that $\Sigma Qi/(Li+k)$ can be used as an effective parameter. From the viewpoint of practical use, the constant k is added to a distance between the electrodes. That is, since $L1=0$, it is impossible to compute $Q1/L1$ for the first electrode. Therefore, k is added to the distance between the electrodes. The inventors have found that the parameter can be put into practical use when the constant k is added to the distance between the electrodes.

The reason why a range is established in the constant k is as follows.

When the constant k is too small, the parameter P is approximately determined by the heat input $Q1$ to the first electrode and H. Therefore, it is impossible to correctly evaluate the influence of the second electrode and those after that. That is the reason why the constant k is set at a value not less than 10. When the constant is too large, the influence of the distance between electrodes cannot be correctly evaluated, that is, the influence of the arrangement of electrodes cannot be correctly evaluated. That is the reason why the constant k is set at a value not more than 150. Practically, when the constant k is set at 50, it is possible to determine a welding condition by which an amount of welding deformation can be reduced.

Next, 1/H will be described as follows.

H is the maximum of the height of the tack-welded bead provided in a butted groove. A parameter to find a relation between the welding deformation behavior and the welding condition can be described by Qi and Li. However, when the steel plates to be welded are not subjected to tack welding at all, that is, when a tack-welded bead is not formed in the groove at all and the steel plates to be welded are not restrained by a tab, the steel plates to be welded are not restrained at all. In this case, even when a welding condition to reduce an amount of welding deformation is adopted, it is substantially impossible to conduct welding. Consequently, it is essentially necessary to restrain the steel plates by a minimum amount of tack-welded bead. Therefore, it is necessary to find a parameter expressing this influence.

The inventors have also investigated the influence of H from the above viewpoint and found the following: When the parameter $\Sigma Qi/(Li+k)$ expressing the influence of a welding condition is multiplied by 1/H, that is, when the parameter P shown by expression (2) is used, it is possible to express the influence of a welding condition and also to express the influence of a tack-welded bead or a tab. The reason why H is the maximum height of the tack-welded bead in the butted groove is that the welding deformation can be most restricted at a position where the bead height is maximum. Therefore, the most effective means is to employ the maximum value H.

Next, the parameter Ptab will be described as follows.

The parameter Ptab is provided when H is replaced with Ht in the parameter P. It is an object of the present invention to reduce an amount of welding deformation mainly by selecting a welding condition. In the practical operation, a tab is used not only for the purpose of reducing an amount of welding deformation but also for accomplishing another object. For example, using a tab is an effective means in the industrial field for preventing the occurrence of a crater at the end portion of welding on the steel plates to be welded. In this case, when a tab is tack-welded to the steel plates to be welded, this tab works to restrain the steel plates to welded. Consequently, the inventors have given consideration to the case in which the steel plates to be welded are restrained by the tab. The inventors have found the following:

Ptab is a parameter for expressing the influence of the tab and welding condition on the welding deformation, and in the same manner as P, the parameter Ptab expresses the influence of the tab.

Next, the reason whey the ranges of H and Ht are limited will be described as follows.

In order to set the parameters P and Ptab in a predetermined range, there are three methods provided. They are a method of selecting an appropriate welding condition, a method of selecting appropriate values of H and Ht, and a method of selecting both the appropriate welding condition and the appropriate values of H and Ht. A method in which the values H and Ht are higher than half of the wall thickness of the steel plates to be welded, is the same as the conventional method in which an amount of the welding deformation is reduced mainly by restraining the steel plates with a tack-welded bead provided in the groove or a tab. An object of the present invention is to reduce an amount of welding deformation mainly by selecting a welding condition. Therefore, when the values of H and Ht are higher than half of the wall thickness of the steel plates to be welded, it is contrary to the object of the present invention. Therefore, the values H and Ht are set to be not more than half of the wall thickness of the steel plate to be welded.

Next, the reason why the ranges of P and Ptab are limited will be described below.

In the case where a tack-welded bead is formed in a butted groove, the steel plates to be welded are mainly restrained by the tack-welded bead formed in the butted groove. In the aforementioned case, according to the conventional welding condition, the value p becomes higher than 0.14. Therefore, it is impossible to realize a reduction in welding deformation unless a tab is used for restraining the steel plates or gas burners are used for controlling the thermal history. The reason why the upper limit of P is set at 0.14 is that the value 0.14 is an upper limit to provide the same effect as that of the conventional method for reducing an amount of welding deformation. It is preferable that the welding condition and H are determined in such a manner that the value P becomes not more than 0.04 in the case of k=50.

In the case where a tab is welded to steel plates to be welded, the tab functions to restrain the steel plates to be welded. However, when the value Ptab is lower than 0.009, it coincides with the conventional welding deformation reducing method in which a tab is used. It is contrary to the object of the present invention. Therefore, the range of Ptab is determined to be not less than 0.009. In the case where the value Ptab is in the above range, it is necessary to determine an upper limit of P for reducing an amount of welding deformation in the same manner as the conventional method. In this case, since the steel plates are restrained by the tab, an amount of welding deformation can be reduced even when the value P is higher than 0.14. For this reason, the upper limit of P is determined to be 0.26. Preferably, the welding condition and Ht are determined in such a manner that Ptab is not less than 0.02 in the case of k=50, and P is not more than 0.08.

Next, the reason why the number of electrodes is limited to a value not less than 3 will be described as follows.

Figure 5A:
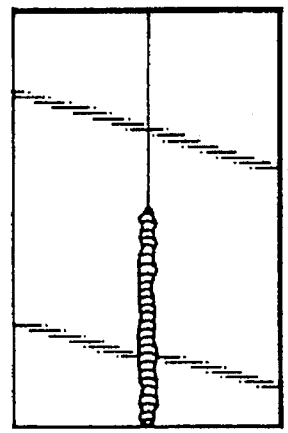
FIGS. 5(a) and 5(b) show a condition of distortion, and FIG. (a) shows a condition of distortion on the surface and FIG. (b) shows a condition out of the surface.
Figure 5A:
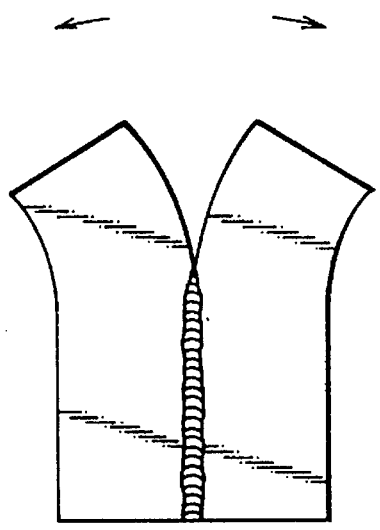

Welding deformation includes the following two problems. One is a deformation in a plane, and the other is a deformation out of a plane. In the case of welding for joining steel plates, the deformation out of a plane is caused when the welding heat history on a surface (from now on, it means a surface of the welding electrodes side) of the steel plate and that of a back surface (from now on, it means a surface opposite to the welding electrodes side) are different, and the deformation out of a plane is also caused when an amount of deposited weld metal on the surface and that on the back surface are different. The deformation in a plane is defined as a welding deformation existing in the same plane. A typical deformation in a plane is shown in FIG. 5(a). The welding deformation shown in FIG. 5(a) is formed when a groove ahead of the welding bead is opened during the process of welding. This welding deformation is formed as if the steel plates to be welded were rotated around the welding arc. Therefore, this welding deformation is referred to as a rotational deformation. In this connection, end cracks are caused by this rotational deformation.

Figure 5B:
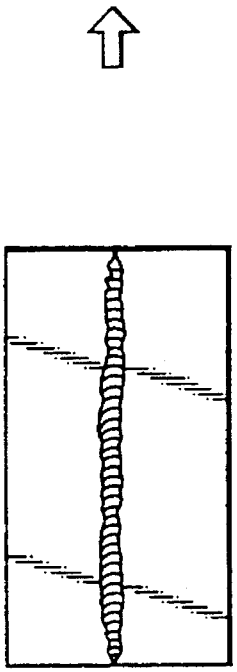
Figure 5B:
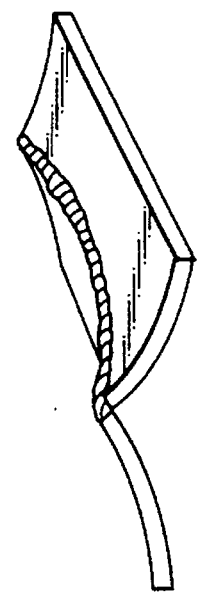

On the other hand, the deformation out of a plane is a welding deformation which is not disposed in the same plane. A typical example of the deformation out of a plane is shown in FIG. 5(b). This deformation out of a plane is caused when an amount of deformation of the surface and that of the back surface are different. In the case shown in FIG. 5(b), a corner deformation and deflection are caused on the steel plates to be welded.

In the welding operation for joining steel plates using electrodes, the number of which is not more than 2, the heat input for each electrode is increased, so that an amount of deposited metal for each electrode is also increased. For this reason, compared with a case in which not less than 3 electrodes are used, a difference between the width of a welding bead of the surface and that of the back surface tends to increase, and also the reinforcement of the weld tends to increase. These are some of the factors that cause the welding deformation out of a plane. The inventors have found that even when the parameters P and Ptab are set in the ranges specified by the present invention, in the case where the number of electrodes is not more than 2, although the welding deformation in a plane can be reduced, the welding deformation out of a plane can not be reduced. Due to the foregoing, the number of the electrodes is determined to be 3 or more.

Next, the reason why the welding condition and flux are restricted in the present invention will be explained below.

First, concerning the first and second electrodes, these are preceding electrodes. From the viewpoint of practical use, it is very important to form a back bead with these preceding electrodes. In order to form a back bead, it is necessary to form a key hole. The reason why the currents of the first and second electrodes are set at a value not less than 900 A is that the minimum current 900 A is required for forming a key hole using an arc force. The reason why the upper limit 2400 A is determined is that when the current is increased to be higher than 2400 A, a melting pool goes out of control so that an excellent bead cannot be formed. Concerning the third electrode and after that, these succeeding electrodes function so as to form a surface bead. These succeeding electrodes are different from the preceding electrodes, and it is not necessary to form a back bead (uranami) with these succeeding electrodes, and it is also not necessary to form a key hole with these succeeding electrodes. For this reason, it is possible to form an excellent bead using a current lower than that of the first and second electrodes. The reason why the upper limit of the third electrode and after that is set at 2400 A is the same as that of the first and second electrodes. High welding speed is advantageous for enhancing the labor efficiency. However, when the welding speed is too high, welding defects such as undercut are caused. The reason why the upper limit of welding speed is set at 200 cm/min is that the occurrence of welding defects such as undercut is prevented when the welding speed is lower than the limit. There are two reasons for setting the lower limit. One reason is as follows. Since the lower limit of the current of the preceding electrode is 900 A and that of the succeeding electrode is 600 A, in the case where the welding speed is lower than 60 cm/min, the amount of deposited metal is excessively increased. The other reason is as follows. Since the back bead of the preceding electrode is formed using the force of an arc, even when the welding speed is increased, a sufficiently excellent back bead can be formed. The lower limit is determined at 60 cm/min for the reason described above. The welding speed has an influence on the welding heat input. However, when the heat input is reduced, the parameter P is necessarily reduced. For this reason, it is practically effective to set a lower limit of the welding speed.

Next, the reason why flux of the surface and the back surface is restricted will be explained as follows.

The occurrence of welding deformation is determined by the welding condition, and selection of flux is not related to welding deformation. According to the welding condition of the present invention, the lower limit of the currents of the first and second electrodes is 900 A, and the upper limit is 2400 A. In the case where welding is conducted by a high current, flux of high fire resistance is required. The bonded type flux is provided with high fire resistance. Therefore, flux is limited to the bonded type flux in the present invention.

Next, the reason why the groove configuration is limited will be explained as follows.

From the viewpoint of practical use, welding deformation caused in one side welding for joining plates is not affected by the groove configuration. However, in order to form an excellent welding bead, the groove configuration must be appropriate. FIG. 7 shows Y, V, I and U grooves to which the groove of the present invention is restricted for providing an excellent welding bead in one side welding for joining plates. In this case, the U groove is not limited to the example shown in the drawing, and an modified U groove is included. In the present invention, the groove configuration is limited to reduce welding deformation and provide a bead having an excellent configuration.

The reason why the steel plate is limited will be described below.

It is a primary object of the present invention to reduce welding deformation. Therefore, an amount of welding deformation can be reduced irrespective of the type of the steel plate to be welded. However, a steel plate of which the tensile strength is lower than 390 MPa is not suitable for a welded construction, so that the lower limit of the tensile strength is set at a value not less than 390 MPa. The reason why the upper limit of the tensile strength is set at 780 MPa is that in the case of a steel plate of which the tensile strength is not less than 780 MPa, there is a possibility that the toughness of a welded portion is deteriorated in one side welding for joining steel plates. For this reason, the upper limit is set at this value for securing the reliability of the welded portion.

Concerning the wall thickness, from the viewpoint of practical use, only steel plates of which the wall thickness is not less than 8 mm are subjected to one side welding for joining. This is the reason why the lower limit is set at 8 mm. The reason why the upper limit of the wall thickness is set at 50 mm is described that when steel plates of which the wall thickness is not less than 50 mm are subjected to one side welding for joining, the current of each electrode is excessively increased, and there is a possibility that a welding bead of excellent configuration cannot be provided. As the wall thickness becomes large, the amount of deposited metal is increased, so that the welding speed is lowered and the welding operation cannot be executed effectively. Further, when an excessive amount of heat input is applied to the steel plate to be welded, the toughness of the steel plate is deteriorated.

When the welding conditions are restricted as explained above, the parameter P can be lowered, that is, an amount of welding deformation is reduced, and a welded joint having an excellent bead configuration can be provided at a relatively high welding efficiency in which the welding speed is maintained in the range of 60 to 200 cm/min.

EXAMPLE

Figure 2:
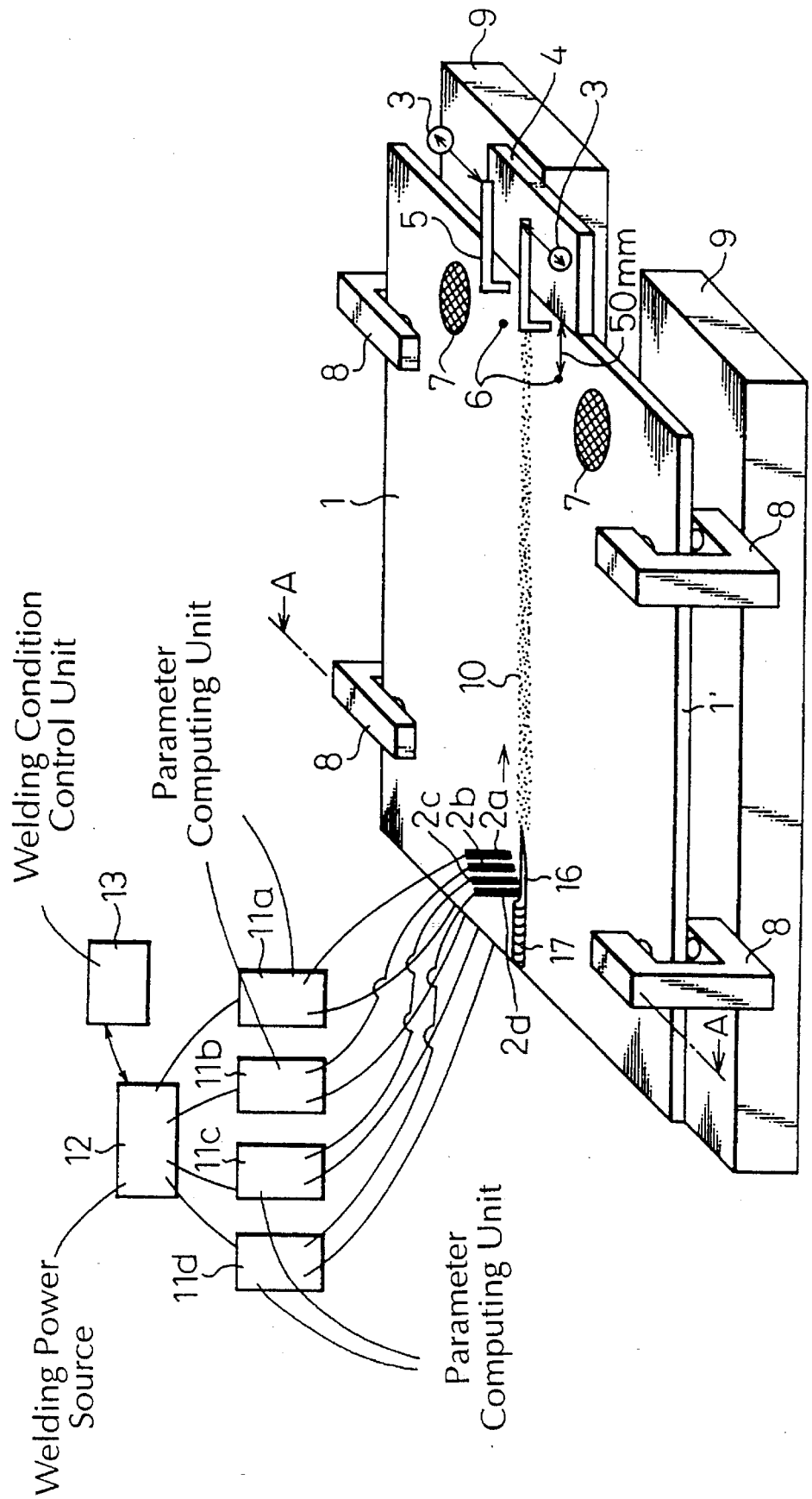
FIG. 2 is a conceptional schematic illustration showing the welding method of the present invention.
Figure 3:
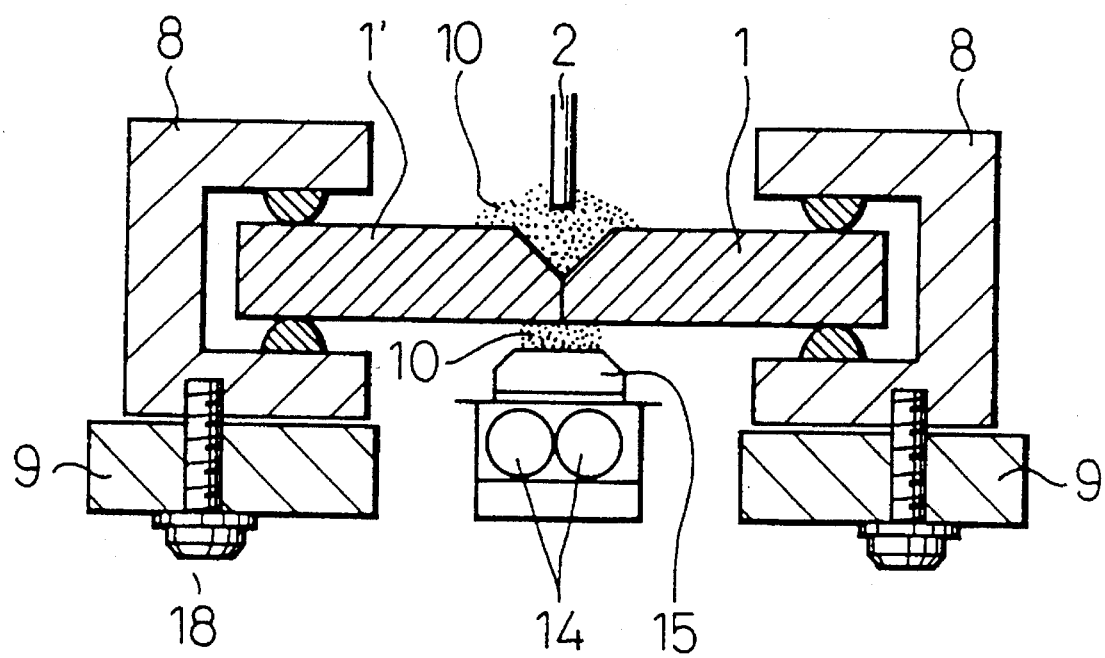
FIG. 3 is a sectional schematic illustration taken on line A—A in FIG. 2

With reference to the experimental device illustrated in FIGS. 2 and 3, an example of the present invention will be explained as follows. As shown in the drawings, two steel plates 1, 1' to be welded by one side welding were butted and fixed by two pairs of clamps 8 attached to a welding mount 9. Further, side ends of the butted portion of the steel plates 1, 1' to be welded were fixed by a tab 4. Groove portions formed at the butted end portions of the steel plates 1, 1' were previously subjected to tack-welding, and then one side welding for joining the steel plates was conducted using the two, three, four, five or six electrodes, although four electrodes 2a to 2d are used in the device shown in FIG. 2. In FIG. 3, numeral 14 is an air hose. By the action of air pressure in the air hose, the pushing force of a backing plate 15 is adjusted, that is, the position of the backing plate 15 is adjusted, so that the steel plates to be welded can be supported.

The welding apparatus used here is described as follows. For example, in the case of 4 electrode welding, welding electrodes 2a, 2b, 2c, 2d were respectively connected to welding power sources 11a, 11b, 11c, 11d. These welding power sources 11a to 11d were connected with a welding condition control unit 12 and parameter computing unit 13. The following were used so as to compute tile parameter P from the expression (2): the maximum height H of a tack-welded bead which was previously measured; the heat input Qi found by the expression (1) from the current, voltage and welding speed of the i-th electrode; the distance Li from the first to the i-th electrode; and the constant k. Using the computed parameter P, H was made to be half of the wall thickness of steel plates to be welded, and the welding conditions such as a current and voltage of each welding electrode, welding speed and a distance between electrodes were determined so that the value P could be not more than 0.14.

When a tab 4 was used, it was previously tack-welded to the side end of a butted portion of the steel plates 1, 1' to be welded. In this case, the welding conditions such as a current and voltage in each welding electrode, welding speed and distance between the electrodes were determined using the parameter Ptab so that H and Ht could be not more than half of the wall thickness of the steel plates to be welded and so that the value P could be not more than 0.26 and the value Ptab could be not less than 0.009. In this case, the parameter Ptab was computed by the expression (3) using the maximum height H of the tack-welded bead at the butted portion of the steel plates 1, 1' to be welded, the thickness of the tab, and the maximum value Ht of the tack-welded bead formed between the tab and the steel plates to be welded.

In Tables 1 and 2, there are shown welding conditions adopted in the present invention such as a current I, voltage E, welding speed V and distance between electrodes L. In Tables 1 and 2, there are also shown a wall thickness, maximum height H of a tack-welded bead formed in the butted groove, parameter P (shown in expression (2)) computed according to the welding condition, and groove configuration. Concerning constant k, three values 10, 50, 150 were selected. The groove angle θ and root face Rf of the groove configuration shown on Tables 1 and 2 respectively correspond to θ and Rf shown in FIG. 1. In this connection, in the case where the steel plates 1, 1' to be welded were restrained by the tab 4, the tab 4 was welded to the steel plates 1, 1' to be welded as illustrated in FIGS. 2 and 3. In the case where the steel plates 1, 1' to be welded were not restrained by the tab 4, pieces of cut wire were scattered between the tab 4 and the steel plates 1, 1' to be welded.

With respect to the steel plates that were subjected to one side welding so as to be joined under the welding conditions shown in Tables 1 and 2, amounts of deformation of three types were measured. That is, an amount of deformation in a plane caused in the process of welding, an amount of transversal shrinkage remaining after welding, and an amount of angular deformation were measured. The amount of deformation in a plane was measured in the following manner. As shown in FIG. 2, a plate 5 for measuring the deformation, the length of which was 300 mm, was attached to an end of the steel plates 1 at a position which was separated from the center of the groove by 20 mm, and the deformation of this plate was measured with a dial gauge 3. An amount of deformation measured when the first electrode 2a had come to a position separated from the end portion by 50 mm, was adopted to be used as a measured value.

The transversal shrinkage of residual deformation was measured in the following manner. Two contact balls 6 were respectively provided beforehand at a position separated from the end portion by 50 mm and also separated from the center of the groove by 50 mm. A distance between the contact balls 6 was measured before and after the welding operation, and its difference was found. This difference was used as the transversal shrinkage. An amount of angular deformation was found in such a manner that an angle of the steel plate was measured with an angle gauge, and a difference between before and after the welding operation was determined as the angular deformation. In Tables 3 and 4, results of the measurement of the amounts of these three types of deformation are shown in the cases of the conventional method and the comparative example.

TABLE 1

| | Wall thickness | Current (A) | | | | | | Voltage (V) | | | | | | Speed |
|---|---|---|---|---|---|---|---|---|---|---|---|---|---|---|
| Number | (mm) | 1E | 2E | 3E | 4E | 5E | 6E | 1E | 2E | 3E | 4E | 5E | 6E | (cm/min) |
| 1 | 9 | 900 | 630 | — | — | — | — | 32 | 40 | — | — | — | — | 65 |
| 2 | 9 | 1050 | 900 | 650 | — | — | — | 35 | 40 | 45 | — | — | — | 100 |
| 3 | 9 | 1350 | 1050 | 650 | 650 | — | — | 35 | 40 | 40 | 45 | — | — | 160 |
| 4 | 12 | 1050 | 800 | — | — | — | — | 38 | 42 | — | — | — | — | 56 |
| 5 | 12 | 1400 | 1100 | 650 | 650 | — | — | 35 | 40 | 40 | 45 | — | — | 150 |
| 6 | 16 | 1150 | 1050 | 700 | — | — | — | 38 | 42 | 45 | — | — | — | 65 |
| 7 | 16 | 1700 | 1300 | 780 | 800 | — | — | 35 | 40 | 40 | 45 | — | — | 150 |
| 8 | 20 | 1250 | 1050 | 850 | — | — | — | 36 | 42 | 46 | — | — | — | 60 |
| 9 | 20 | 1800 | 1450 | 1200 | 1100 | — | — | 35 | 40 | 40 | 45 | — | — | 120 |
| 10 | 20 | 1650 | 1400 | 850 | 800 | 750 | 750 | 35 | 40 | 40 | 45 | 40 | 45 | 120 |
| 11 | 20 | 1700 | 1400 | 750 | 750 | — | — | 35 | 40 | 40 | 45 | — | — | 100 |
| 12 | 25 | 1350 | 1150 | 950 | — | — | — | 36 | 42 | 46 | — | — | — | 55 |
| 13 | 25 | 1700 | 1400 | 1050 | 950 | — | — | 35 | 40 | 40 | 45 | — | — | 90 |
| 14 | 25 | 1800 | 1550 | 900 | 850 | 800 | 750 | 35 | 40 | 40 | 45 | 40 | 45 | 110 |
| 15 | 30 | 1380 | 1150 | 1040 | — | — | — | 36 | 42 | 46 | — | — | — | 45 |
| 16 | 30 | 1900 | 1650 | 1800 | 1700 | — | — | 35 | 40 | 40 | 45 | — | — | 100 |
| 17 | 30 | 1900 | 1650 | 1100 | 1000 | 900 | 750 | 35 | 40 | 40 | 45 | 40 | 45 | 100 |
| 18 | 35 | 1450 | 1200 | 1050 | — | — | — | 38 | 42 | 48 | — | — | — | 38 |
| 19 | 35 | 1700 | 1400 | 1350 | 1250 | — | — | 35 | 40 | 40 | 45 | — | — | 65 |
| 20 | 35 | 2100 | 1750 | 1200 | 1150 | 1200 | 1100 | 35 | 40 | 40 | 45 | 40 | 45 | 100 |
| 21 | 40 | 1450 | 1250 | 1200 | — | — | — | 33 | 42 | 48 | — | — | — | 30 |
| 22 | 40 | 1700 | 1450 | 1250 | 1150 | — | — | 35 | 40 | 40 | 45 | — | — | 50 |
| 23 | 40 | 2100 | 1750 | 1350 | 1450 | 1400 | 1350 | 35 | 40 | 40 | 45 | 40 | 45 | 90 |
| 24 | 30 | 1900 | 1650 | 1800 | 1700 | — | — | 35 | 40 | 40 | 45 | — | — | 100 |
| 25 | 30 | 1900 | 1650 | 1100 | 1000 | 900 | 750 | 35 | 40 | 40 | 45 | 40 | 45 | 100 |
| 26 | 35 | 2100 | 1750 | 1200 | 1150 | 1200 | 1100 | 35 | 40 | 40 | 45 | 40 | 45 | 100 |

Remarks: Characters 1E, 2E, 3E, 4E, 5E and 6E respectively denote the first, second, third, fourth, fifth and sixth electrodes.

TABLE 2

| | Distance between electrodes (mm) | | | | | Groove configuration | | H | P | | |
|---|---|---|---|---|---|---|---|---|---|---|---|
| Number | L2 | L3 | L4 | L5 | L6 | $\theta$ (°) | Rf (mm) | (mm) | k = 10 | k = 50 | k = 150 |
| 1 | 30 | — | — | — | — | 60 | 3 | 3 | 0.108 | 0.0274 | 0.0102 |
| 2 | 30 | 150 | — | — | — | 60 | 3 | 3 | 0.0952 | 0.0266 | 0.0109 |
| 3 | 30 | 230 | 260 | — | — | 50 | 3 | 3 | 0.0749 | 0.0207 | 0.0086 |
| 4 | 35 | — | — | — | — | 60 | 3 | 3 | 0.1692 | 0.0426 | 0.0160 |
| 5 | 30 | 230 | 260 | — | — | 50 | 3 | 3 | 0.0829 | 0.0229 | 0.0095 |
| 6 | 35 | 155 | — | — | — | 60 | 3 | 3 | 0.1705 | 0.0476 | 0.0195 |
| 7 | 30 | 230 | 260 | — | — | 50 | 3 | 3 | 0.1002 | 0.0276 | 0.0114 |
| 8 | 35 | 155 | — | — | — | 50 | 3 | 3 | 0.1957 | 0.0537 | 0.0222 |
| 9 | 30 | 230 | 260 | — | — | 50 | 3 | 3 | 0.1356 | 0.0386 | 0.0165 |
| 10 | 30 | 230 | 260 | 420 | 450 | 50 | 3 | 3 | 0.1266 | 0.0371 | 0.0164 |
| 11 | 30 | 230 | 260 | — | — | 50 | 5 | 3 | 0.1520 | 0.0421 | 0.0174 |
| 12 | 35 | 155 | — | — | — | 50 | 5 | 3 | 0.2254 | 0.0638 | 0.0265 |
| 13 | 30 | 210 | 240 | — | — | 50 | 5 | 3 | 0.1714 | 0.0489 | 0.0208 |
| 14 | 30 | 230 | 260 | 420 | 450 | 45 | 5 | 3 | 0.1507 | 0.0440 | 0.0194 |
| 15 | 35 | 155 | — | — | — | 50 | 5 | 3 | 0.2814 | 0.0798 | 0.0333 |
| 16 | 30 | 210 | 240 | — | — | 40 | 5 | 3 | 0.1787 | 0.0539 | 0.0241 |
| 17 | 30 | 210 | 240 | 400 | 430 | 40 | 5 | 3 | 0.1769 | 0.0526 | 0.0234 |
| 18 | 35 | 155 | — | — | — | 45 | 6 | 3 | 0.3650 | 0.1021 | 0.0425 |
| 19 | 30 | 210 | 240 | — | — | 40 | 7 | 3 | 0.2406 | 0.0705 | 0.0308 |
| 20 | 30 | 210 | 240 | 400 | 430 | 35 | 6 | 3 | 0.1951 | 0.0584 | 0.0264 |
| 21 | 30 | 150 | — | — | — | 45 | 6 | 3 | 0.4305 | 0.1268 | 0.0535 |
| 22 | 30 | 210 | 240 | — | — | 35 | 7 | 3 | 0.3134 | 0.0914 | 0.0396 |
| 23 | 30 | 210 | 240 | 400 | 430 | 35 | 6 | 3 | 0.2196 | 0.0673 | 0.0312 |
| 24 | 30 | 210 | 240 | — | — | 40 | 5 | 5 | 0.1072 | 0.0323 | 0.0145 |
| 25 | 30 | 210 | 240 | 400 | 430 | 40 | 5 | 5 | 0.1061 | 0.0316 | 0.0141 |
| 26 | 30 | 210 | 240 | 400 | 430 | 35 | 6 | 5 | 0.1171 | 0.0350 | 0.0158 |

Remark:
Characters L2, L3, L4, L5 and L6 respectively denote distances from the first to the second, third, fourth, fifth and sixth electrode.

TABLE 2-continued

| | Welding Condition | | | | | | | | | | |
|---|---|---|---|---|---|---|---|---|---|---|---|
| | Distance between electrodes (mm) | | | | | Groove configuration | | H | P | | |
| Number | L2 | L3 | L4 | L5 | L6 | θ (°) | Rf (mm) | (mm) | k = 10 | k = 50 | k = 150 |

Characters θ and Rf of the groove configuration respectively denote a groove angle and root face shown in FIG. 1. Character P denotes a value computed by the expression (2).
Character H denotes the maximum height of the tack-welded bead disposed in a range of 50 mm from the end of in a range of 50 mm from a position of the tack-welded bead closest to the end.

TABLE 3

Example of Measurement of Welding Deformation

| Number | Number of welding condition | P | | | Ht (mm) | Ptab | | | Burner heating | Amount of deformation during welding (mm) | Residual deformation after welding | | Remark |
|---|---|---|---|---|---|---|---|---|---|---|---|---|---|
| | | k = 10 | k = 50 | k = 150 | | k = 10 | k = 50 | k = 150 | | | Transversal shrinkage (mm) | Angular deformation (rad) | |
| 1 | 1 | 0.108 | 0.0274 | 0.0102 | — | — | — | — | No | 0.70 | 0.51 | 0.12 | Comparative example |
| 2 | 2 | 0.0952 | 0.0266 | 0.0109 | — | — | — | — | No | 0.68 | 0.59 | 0.06 | Inventive example |
| 3 | 3 | 0.0749 | 0.0207 | 0.0086 | — | — | — | — | No | 0.52 | 0.55 | 0.05 | Inventive example |
| 4 | 5 | 0.0829 | 0.0229 | 0.0095 | — | — | — | — | No | 0.58 | 0.45 | 0.04 | Inventive example |
| 5 | 7 | 0.1002 | 0.0276 | 0.0114 | — | — | — | — | No | 0.71 | 0.41 | 0.03 | Inventive example |
| 6 | 9 | 0.1356 | 0.0386 | 0.0165 | — | — | — | — | No | 1.00 | 0.50 | 0.02 | Inventive example |
| 7 | 10 | 0.1266 | 0.0371 | 0.0164 | — | — | — | — | No | 0.98 | 0.57 | 0.02 | Inventive example |
| 8 | 11 | 0.1520 | 0.0421 | 0.0174 | — | — | — | — | No | 1.15 | 0.49 | 0.03 | Comparative example |
| 9 | 13 | 0.1714 | 0.0489 | 0.0208 | — | — | — | — | No | 1.35 | 0.49 | 0.03 | Comparative example |
| 10 | 15 | 0.2814 | 0.0798 | 0.0333 | — | — | — | — | No | 2.05 | 0.60 | 0.01 | Comparative example |
| 11 | 19 | 0.2406 | 0.0705 | 0.0308 | — | — | — | — | No | 1.85 | 0.55 | 0.01 | Comparative example |
| 12 | 21 | 0.4305 | 0.1268 | 0.0535 | — | — | — | — | No | 3.25 | 0.73 | <0.01 | Comparative example |
| 13 | 22 | 0.3134 | 0.0914 | 0.0396 | — | — | — | — | No | 2.55 | 0.61 | <0.01 | Comparative example |
| 14 | 24 | 0.1072 | 0.0323 | 0.0145 | — | — | — | — | No | 0.85 | 0.52 | 0.01 | Inventive example |
| 15 | 25 | 0.1061 | 0.0316 | 0.0141 | — | — | — | — | No | 0.82 | 0.54 | 0.01 | Inventive example |
| 16 | 26 | 0.1171 | 0.0350 | 0.0158 | — | — | — | — | No | 0.89 | 0.54 | 0.01 | Inventive example |
| 17 | 11 | 0.1520 | 0.0421 | 0.0174 | — | — | — | — | Yes | 0.88 | 0.40 | 0.04 | Conventional method |
| 18 | 13 | 0.1714 | 0.0489 | 0.0208 | — | — | — | — | Yes | 0.99 | 0.39 | 0.03 | Conventional method |

TABLE 4

Example of Measurement of Welding Deformation

| Number | Number of welding condition | P k = 10 | P k = 50 | P k = 100 | Ht (mm) | Ptab k = 10 | Ptab k = 50 | Ptab k = 150 | Burner heating | Amount of deformation during welding (mm) | Residual deformation after welding Transversal shrinkage (mm) | Residual deformation after welding Angular deformation (rad) | Remark |
|---|---|---|---|---|---|---|---|---|---|---|---|---|---|
| 19 | 21 | 0.4305 | 0.1268 | 0.0535 | — | — | — | — | Yes | 2.90 | 0.58 | 0.01 | Comparative example |
| 20 | 22 | 0.3134 | 0.0914 | 0.0395 | — | — | — | — | Yes | 1.93 | 0.48 | 0.01 | Comparative example |
| 21 | 4 | 0.1692 | 0.0426 | 0.0160 | 3.0 | 0.1692 | 0.0426 | 0.0160 | No | 0.89 | 0.58 | 0.11 | Comparative example |
| 22 | 6 | 0.1705 | 0.0476 | 0.0195 | 4.0 | 0.1279 | 0.0357 | 0.0146 | No | 0.74 | 0.59 | 0.03 | Inventive example |
| 23 | 8 | 0.1957 | 0.0537 | 0.0222 | 5.0 | 0.1174 | 0.0322 | 0.0133 | No | 0.67 | 0.58 | 0.03 | Inventive example |
| 24 | 11 | 0.1520 | 0.0421 | 0.0174 | 5.0 | 0.0912 | 0.0253 | 0.0104 | No | 0.50 | 0.53 | 0.02 | Inventive example |
| 25 | 12 | 0.2254 | 0.0638 | 0.0265 | 6.3 | 0.1073 | 0.0304 | 0.0126 | No | 0.63 | 0.55 | 0.01 | Inventive example |
| 26 | 13 | 0.1714 | 0.0489 | 0.0208 | 6.3 | 0.0816 | 0.0233 | 0.0099 | No | 0.50 | 0.48 | 0.01 | Inventive example |
| 27 | 14 | 0.1507 | 0.0440 | 0.0194 | 6.3 | 0.0718 | 0.0210 | 0.0092 | No | 0.43 | 0.55 | 0.01 | Inventive example |
| 28 | 16 | 0.1787 | 0.0539 | 0.0241 | 7.5 | 0.0715 | 0.0216 | 0.0096 | No | 0.44 | 0.52 | 0.01 | Inventive example |
| 29 | 17 | 0.1769 | 0.0526 | 0.0234 | 7.5 | 0.0708 | 0.0210 | 0.0094 | No | 0.42 | 0.51 | <0.01 | Inventive example |
| 30 | 18 | 0.3650 | 0.1021 | 0.0425 | 8.8 | 0.1244 | 0.0348 | 0.0145 | No | 0.73 | 0.63 | 0.01 | Comparative example |
| 31 | 19 | 0.2406 | 0.0705 | 0.0308 | 8.8 | 0.0820 | 0.0240 | 0.0105 | No | 0.47 | 0.53 | 0.01 | Inventive example |
| 32 | 20 | 0.1951 | 0.0584 | 0.0264 | 8.0 | 0.0732 | 0.0219 | 0.0099 | No | 0.44 | 0.52 | 0.01 | Inventive example |
| 33 | 21 | 0.4305 | 0.1268 | 0.0535 | 10.0 | 0.1291 | 0.0380 | 0.0161 | No | 0.80 | 0.75 | 0.01 | Comparative example |
| 34 | 22 | 0.3134 | 0.0914 | 0.0396 | 10.0 | 0.0940 | 0.0274 | 0.0119 | No | 0.57 | 0.65 | 0.01 | Comparative example |
| 35 | 23 | 0.2196 | 0.0673 | 0.0312 | 10.0 | 0.0659 | 0.0202 | 0.0094 | No | 0.41 | 0.59 | <0.01 | Inventive example |
| 36 | 15 | 0.2814 | 0.0798 | 0.0333 | 15.0 | 0.0563 | 0.0160 | 0.0067 | No | 0.31 | 0.58 | 0.02 | Conventional method |
| 37 | 18 | 0.3650 | 0.1021 | 0.0425 | 17.5 | 0.0626 | 0.0175 | 0.0073 | No | 0.33 | 0.59 | 0.01 | Conventional method |
| 38 | 21 | 0.4305 | 0.1268 | 0.0535 | 20.0 | 0.0646 | 0.0190 | 0.0080 | No | 0.37 | 0.58 | 0.01 | Conventional method |
| 39 | 22 | 0.3134 | 0.0914 | 0.0396 | 20.0 | 0.0470 | 0.0137 | 0.0059 | No | 0.26 | 0.59 | 0.01 | Conventional method |

The following are shown in the tables. In the cases of Nos. 1 to 16 in which the steel plates to be welded were not restrained by a tab and further gas burner heating was not conducted, the amounts of deformation during welding were suppressed to be not more than 1.00 mm when the parameter P was not more than 0.14. In the cases of Nos. 8 and 9 in which the parameter P was higher than 0.140, the amounts of deformation during welding were larger than 1.00 mm. In the cases of the conventional methods 17 and 18 in which gas burner heating was conducted at the position 7 shown in FIG. 2 in the cases of Nos. 8 and 9, the amount of deformation during welding was reduced to a value not more than 1.00 mm when burner heating was conducted. In all examples of the present invention, the amounts of deformation during welding were suppressed to a value not more than 1.00 mm in the same manner as the conventional method. In this connection, in the cases of Nos. 12 and 13 in which the parameter P was high, the amounts of deformation during welding were respectively 3.25 mm and 2.55 mm, which are large, and even in the cases of Nos. 19 and 20 in which burner heating was conducted in Nos. 12 and 13, the amounts of deformation during welding were not reduced to a value not more than 1.00 mm. In the cases of Nos. 12 and 13, the amounts of deformation were reduced to a value not more than 1.00 mm only when the steel plates to be welded were restrained by a tab in the same manner as the conventional methods of Nos. 38 and 39. In the case of No. 1 in which the parameter P was lowered, the amount of deformation during welding was suppressed, however, as the two electrode welding was adopted, an amount of angular deformation was increased to 0.12 rad, which is somewhat high. In the examples of the present invention, all the amounts of angular deformation were smaller than 0.10 rad in the same manner as the conventional method.

In the cases of Nos. 21 to 39 in which the steel plates to be welded were restrained by a tab, when the parameter P was not more than 0.26, the amounts of deformation were sufficiently small even when the parameter Ptab was not less than 0.009 at which a restraining force to restrain the steel plates was low. However, in the case of No. 21 in which the parameter P was not more than 0.26 and the parameter Ptab was not less than 0.009, as two electrode welding was conducted, an amount of angular deformation was 0.11 rad, which was large. In the cases of Nos. 30, 33 and 34 in which the parameter P was higher than 0.26, the amounts of deformation during welding were suppressed to a value not more than 1.00 mm, however, the amounts of transversal shrinkage were 0.63 mm, 0.75 mm and 0.65 mm which were larger than 0.60 mm. In the examples of the present invention, all the amounts of transversal shrinkage were not more than 0.60 mm in the same manner as the conventional method, and the amounts of transversal shrinkage were reduced to a value relatively smaller than those of the cases Nos. 37, 38 and 39 which were the conventional method in which a restraining force to restrain the steel plates was high.

As described above, according to the method of the present invention, an amount of welding deformation can be reduced in the same manner as the conventional method.

It has been widely believed that welding distortion caused in the process of one side welding for joining plates can be effectively avoided by means of heating the steel plates with gas burners or strongly restraining them with tabs. However, according to the present invention, it is not necessary to heat or highly restrain the steel plates. When the welding condition is determined so that the parameters P and Ptab can be set in a predetermined range, welding distortion is reduced. Therefore, the present invention is very effective and enhances labor efficiency in the process of welding and reduces a burden imposed on the welding apparatus.

We claim:

1. A method of optimizing a welding condition for reducing welding distortion to a minimum by reducing a heavy burden imposed on preparation work for welding and a welding apparatus, in one side welding for joining plates in which steel plates to be welded are butted against each other, a tack-welded bead is formed and fixed in a groove, and not less than three electrodes are applied, said method comprising the steps of:

1) selecting maximum height H(mm) of the tack-welded bead in the butted groove to be not more than half of the wall thickness of said steel plate to be welded;

2) selecting distance Li(mm) from the first electrode to the i-th electrode;

3) setting a positive constant K;

4) establishing a parameter P defined by the following expression (2) in an allowable range;

5) computing an amount of inputted heat Qi(kJ/mm) by the following expression (2); and 6) selecting suitable combinations of current Ii(A) and voltage Ei(V) and welding speed Vi(cm/min) of said i-th electrode by the following expression (1), $$Qi = Ii \times Ei \times 6 \div Vi \qquad \text{Expression (1)}$$

$$P = \frac{1}{H} \sum_{i=1}^{n} \frac{Qi}{Li+k} \qquad \text{Expression (2)}$$

where $L_1$ is O, and n is the number of the electrodes.

2. The method of reducing welding distortion in one side welding for joining plates according to claim 1, wherein a value of constant k in the expression (2) for computing the parameter P is selected from a range of 10 to 150, and a welding condition of each electrode is determined so that the value P can be not more than 0.14.

3. The method of reducing welding distortion in one side welding for joining plates according to one of claim 1, wherein multi-electrode submerged arc welding is employed under the welding condition that: a current of each electrode is not more than 2400 A; currents of the first and second electrodes are not less than 900 A; currents of the third electrode and after that are not less than 600 A; a welding speed is not less than 60 cm/min and not more than 200 cm/min; and a bonded type flux is used at the surface and the back.

4. The method of reducing welding distortion in one side welding for joining plates according to one of claim 1, wherein a Y-groove, I-groove, V-groove or U-groove is adopted.

5. The method of reducing welding distortion in one side welding for joining plates according to one of claim 1, wherein the tensile strength of steel plates to be joined is not less than 390 MPa and not more than 780 MPa, and the wall thickness is not less than 8 mm and not more than 50 mm.

6. A method of optimizing a welding condition for reducing welding distortion to a minimum by reducing a heavy burden imposed on preparation work for welding and a welding apparatus, in one side welding for joining plates in which steel plates to be welded are butted against each other, a tack-welded bead is formed and fixed in a groove, a tab is tack-welded and fixed at an end portion of the steel plates to be welded, and not less than three electrodes are applied, said method comprising the steps of:

1) selecting maximum height H(mm) of the tack-welded bead in the butted groove to be not more than half of the wall thickness of said steel plate to be welded;

2) selecting distance Li(mm) from the first electrode to the i-th electrode;

3) setting a positive constant K;

4) establishing parameter Ptab defined by the following expression (3) as not less than 0.009;

5) establishing parameter P defined by the following expression (2) in an allowable range;

6) computing an amount of inputted heat Qi(kJ/mm) by said expression (2) so that said Qi also satisfies said expression (3); and 7) selecting suitable combinations of current Ii(A) and voltage Ei(V) and welding speed Vi(cm/min) of said i-th electrode by the following expression (1), $$Qi = Ii \times Ei \times 6 \div Vi \qquad \text{Expression (1)}$$

$$P = \frac{1}{H} \sum_{i=1}^{n} \frac{Qi}{Li+k} \qquad \text{Expression (2)}$$

$$Ptab = \frac{1}{Ht} \sum_{i=1}^{n} \frac{Qi}{Li+k} \qquad \text{Expression (3)}$$

where $L_1$ is O, and n is the number of the electrodes, Ht(mm) is the thickness of the tab, Ht(mm) is a smaller value between the thickness of the tab and the height of the tack-welded bead formed between the tab and the steel plate to be welded, and Ht is not more than half of the wall thickness of the steel plate to be welded.

7. The method of reducing welding distortion in one side welding for joining plates according to claim 6, wherein the value k in the expression (2) for computing the parameter P and the expression (3) for computing the parameter Ptab is determined to be in a range from 10 to 150, and a welding condition of each electrode is determined so that the value P can be not more than 0.26.

8. The method of reducing welding distortion in one side welding for joining plates according to claim 6, wherein multi-electrode submerged arc welding is employed under the welding condition that: a current of each electrode is not more than 2400 A; currents of the first and second electrodes are not less than 900 A; currents of the third electrode and after that are not less than 600 A; a welding speed is not less than 60 cm/min and not more than 200 cm/min; and a bonded type flux is used at the surface and the back.

9. The method of reducing welding distortion in one side welding for joining plates according to claim 6, wherein a Y-groove, I-groove, V-groove or U-groove is adopted.

10. The method of reducing welding distortion in one side welding for joining plates according to claim 6, wherein the tensile strength of steel plates to be joined is not less than 390 MPa and not more than 780 MPa, and the wall thickness is not less than 8 mm and not more than 50 mm.

* * * * *

UNITED STATES PATENT AND TRADEMARK OFFICE
CERTIFICATE OF CORRECTION

PATENT NO. : 5,550,347  
DATED : August 27, 1996  
INVENTOR(S) : Tadashi KASUYA, et al.

Page 1 of 3

It is certified that error appears in the above-indentified patent and that said Letters Patent is hereby corrected as shown below:

Column 1, line 49, change "NO." to --No.--.

Column 2, line 41, delete the comma after "found".

Column 2, line 63, change "...x6+Vi" to --...6÷Vi--.

Column 3, line 4, change "(ram)" to --(mm)--.

Column 4, line 15, change "A--A" to --A-A--.

Column 4, line 53, change "p" to --P--.

Column 4, line 58, change "...x6+Vi" to --...6÷Vi--.

Column 5, line 21, change "before)," to --before);--.

Column 6, line 1, change "oy'-H," to --oy'·H,--.

Column 7, line 12, change "Ll=0," to --$L_1$=0,-- and "Q1/L1" to --$Q_1/L_1$--.

Column 7, line 20, change "Q1" to --$Q_1$--.

Column 8, lines 3 and 4, change "plates to welded." to --plates to be welded.--.

Column 8, line 11, change "whey" to --why--.

Column 8, line 37, change "value p" to --value P--.

UNITED STATES PATENT AND TRADEMARK OFFICE
CERTIFICATE OF CORRECTION

PATENT NO. : 5,550,347
DATED : August 27, 1996
INVENTOR(S) : Tadashi KASUYA, et al.

It is certified that error appears in the above-indentified patent and that said Letters Patent is hereby corrected as shown below:

Column 10, line 42, change "an" to --a--.

Column 10, line 67, delete "described".

Column 11, line 34, delete the comma after "adjusted".

Column 15, Table 2, last line, change "of in a range" to --or in a range--.

Column 15, Table 3, do not leave a space between lines of column heading.

Column 16, Table 3, do not leave a space between lines of column headings.

Column 17, Table 4, do not leave a space between lines of column heading.

Column 17, Table 4, change heading "k = 100" to --k = 150--.

Column 18, Table 4, do not leave a space between lines of column headings.

UNITED STATES PATENT AND TRADEMARK OFFICE
CERTIFICATE OF CORRECTION

PATENT NO. : 5,550,347
DATED : August 27, 1996
INVENTOR(S) : Tadashi KASUYA, et al.

It is certified that error appears in the above-indentified patent and that said Letters Patent is hereby corrected as shown below:

Column 19, line 8, change "mm," to --mm;--.

Column 19, line 61, change "0," to --0,--.

Column 20, line 2, delete "one of".

Column 20, line 53, change "0," to --0,--.

Signed and Sealed this

Twentieth Day of May, 1997

Attest:

BRUCE LEHMAN

Attesting Officer

Commissioner of Patents and Trademarks